No. 855,822. PATENTED JUNE 4, 1907.
J. B. TALBOT.
APPARATUS FOR MOLDING CEMENT BLOCKS.
APPLICATION FILED MAY 16, 1906.
3 SHEETS—SHEET 1.
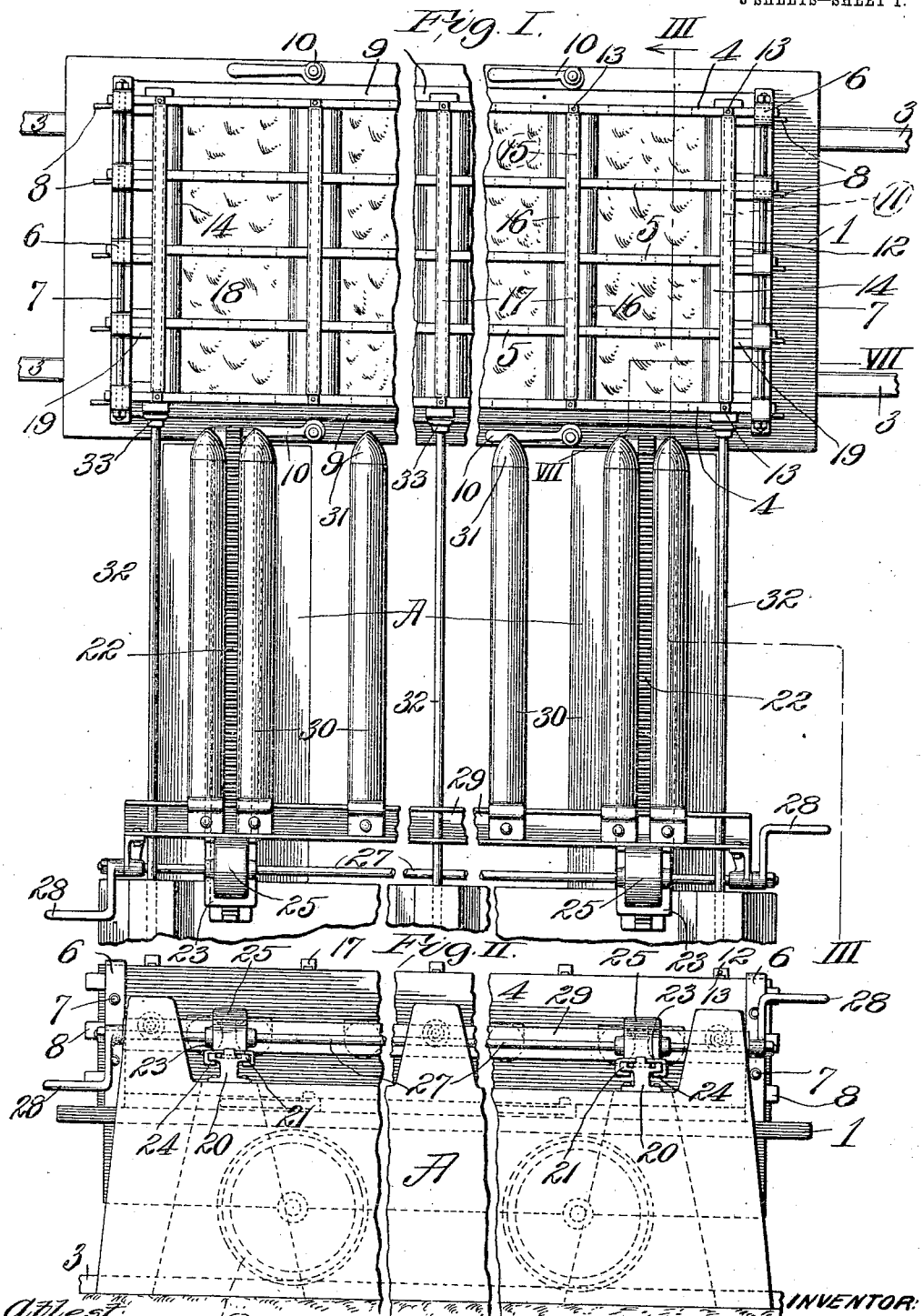

No. 855,822.
PATENTED JUNE 4, 1907.
J. B. TALBOT.
APPARATUS FOR MOLDING CEMENT BLOCKS.
APPLICATION FILED MAY 16, 1906.
3 SHEETS—SHEET 2.
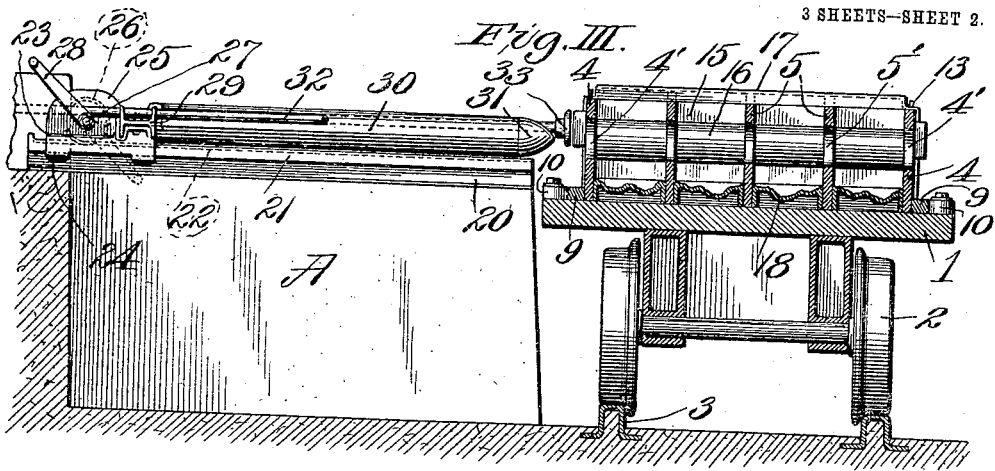
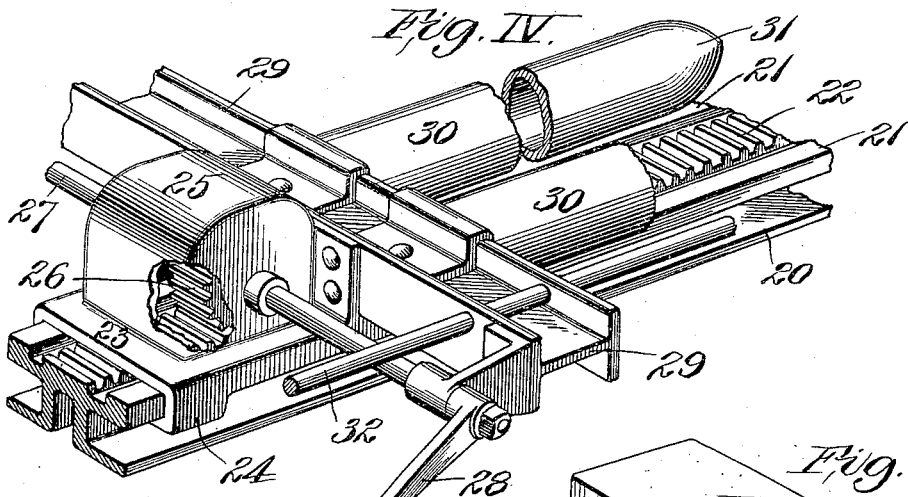
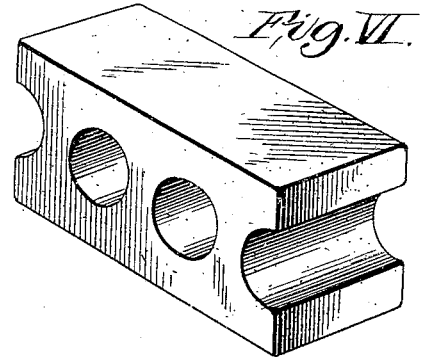
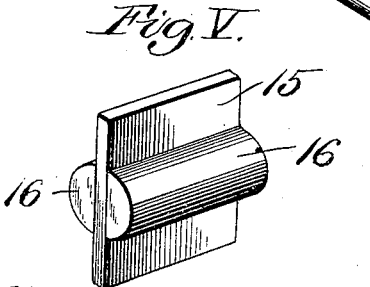
Attest:
Wm. H. Scott
Blanche Hogan
Inventor:
James B. Talbot,
by Wright Bro
attys.

No. 855,822. PATENTED JUNE 4, 1907.
J. B. TALBOT.
APPARATUS FOR MOLDING CEMENT BLOCKS.
APPLICATION FILED MAY 16, 1906.
3 SHEETS—SHEET 3.
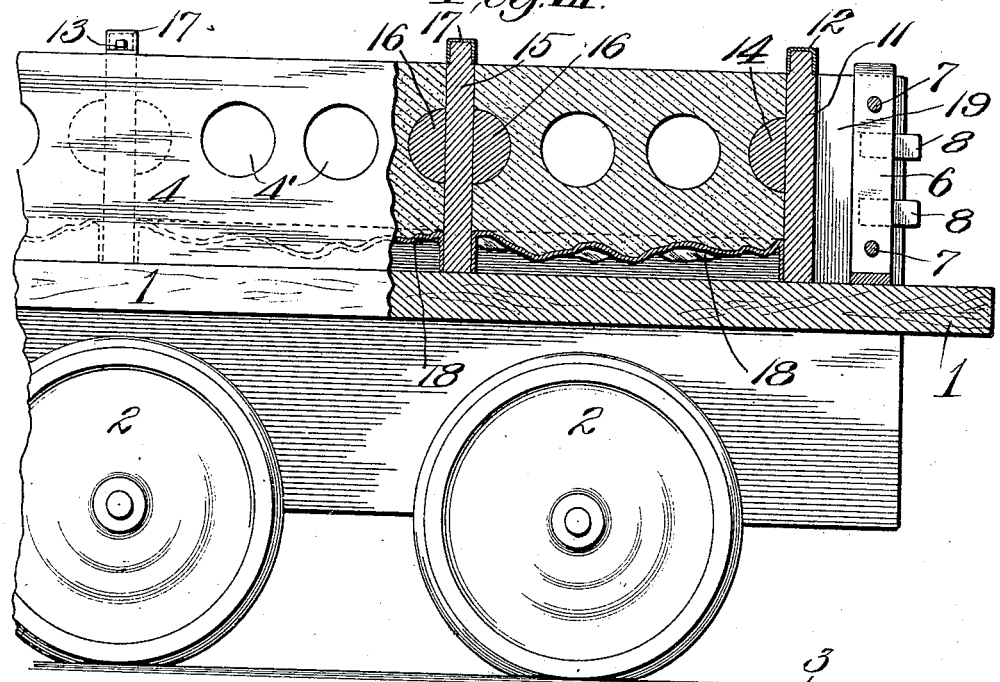
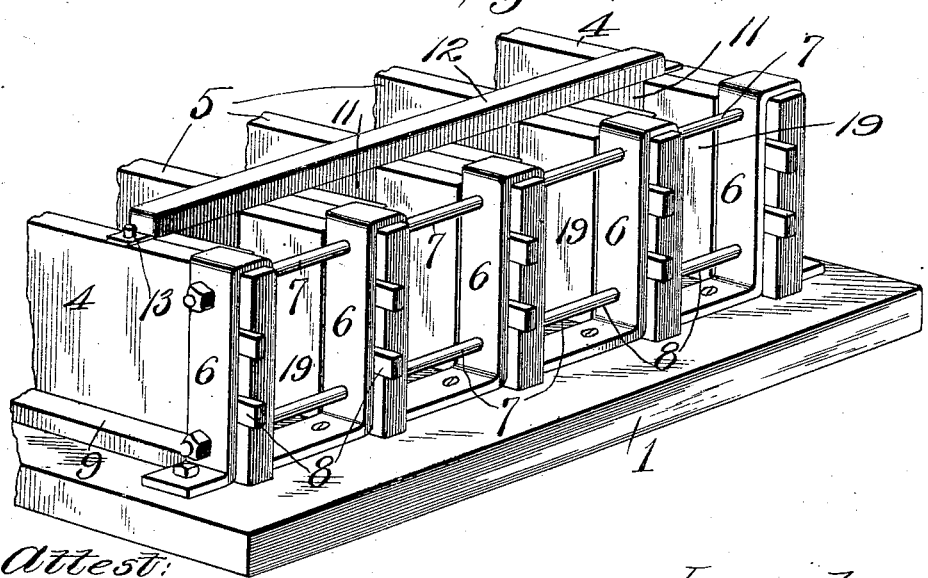
Attest:
Wm H Scott
Blanche Hogan
Inventor:
James B. Talbot,
by Wright Bros
attys

UNITED STATES PATENT OFFICE.

JAMES B. TALBOT, OF EDWARDSVILLE, ILLINOIS.

APPARATUS FOR MOLDING CEMENT BLOCKS.

No. 855,822.  Specification of Letters Patent.  Patented June 4, 1907.

Application filed May 16, 1906. Serial No. 317,061.

*To all whom it may concern:*

Be it known that I, JAMES B. TALBOT, a citizen of the United States, residing in Edwardsville, in the county of Madison and State of Illinois, have invented certain new and useful Improvements in Apparatus for Molding Cement Blocks, of which the following is a full, clear, and exact description, reference being had to the accompanying drawings, forming part of this specification.

My invention relates to an apparatus for molding cement blocks and it includes a movable platform or truck supporting mold members, coring members movably mounted and adapted to enter said molding members, and means whereby said coring members are operated to position them in the molding members and withdraw them therefrom.

Figure I is a top or plan view of my apparatus partly broken out. Fig. II is a rear elevation of the apparatus as illustrated in Fig. I. Fig. III is in part a side elevation of the apparatus and in part a vertical transverse section taken in line III—III, Fig. I, looking in the direction of the arrow crossing said line. Fig. IV is an enlarged perspective view of portions of the coring member carrying and actuating means partly broken away. Fig. V is an enlarged perspective view of one of the division and groove forming mold members. Fig. VI is a perspective view of one of the cement blocks which my machine is designed to produce. Fig. VII is an enlarged view, in part a side elevation of the mold box truck and mold box of my apparatus, and in part a vertical longitudinal section taken through the truck platform and the mold box on line VII—VII, Fig. I. Fig. VIII is an enlarged perspective view of one end of the truck platform and the mold box thereon.

1 designates the platform of a truck which is supported by wheels 2 that are adapted to travel upon track rails 3. The truck platform serves as a support for a mold box which is constructed as follows: 4 are outer longitudinal mold box walls and 5 are longitudinal partitions located intermediate of said longitudinal side walls and spaced apart from the side walls and from each other any desirable distances to provide spaces between them according to the widths it is desired to produce the cement blocks. Each of the side walls of the mold box is provided at intervals with perforations 4' to receive the coring members to be hereinafter more particularly mentioned and each of the longitudinal partitions is provided with perforations 5' corresponding in number to the perforations in the side walls and which also receive said coring members. The longitudinal side walls 4 and partitions 5 of the mold box are mounted in upright positions or on edge upon the truck platform 1, and each of said members is confined at its ends within inverted U-shaped yokes 6 which are secured to the truck platform and embrace the side walls and partitions.

7 are tie-rods which extend transversely of the mold box through the side walls and partitions and the yokes that confine them, and by which said side walls and partitions are held from longitudinal movement on the truck platform. For the purpose of taking up any play between the side walls and partitions and their confining yokes, I preferably introduce between said members wedges 8 that serve to hold the ends of the side walls and partitions from lateral movement in their yokes.

9 are retaining strips which are seated upon the truck platform alongside of the mold box side walls and which are adapted to be firmly held against said side walls by eccentric levers 10 pivoted to the truck platform for the purpose of preventing spreading of the central portions of said side walls.

11 designates end boards of the mold box which correspond in width to the spaces between the longitudinal partitions 5 and between the outer partitions and the longitudinal side walls 4. The boards 11 at each end of the mold box are attached to a carrying bar 12 preferably of channel shape, as illustrated in Fig. VII, whereby said boards are united in sets and the carrying bars are connected to the longitudinal side bars of the mold box by any suitable means, such as by the employment of pins or bolts 13 seated in said side walls. Each of the end boards is provided at its inner side with a rib or bead 14.

15 are intermediate division boards or transverse partitions that are located in the spaces between the longitudinal partitions 5 and the outer partitions and the longitudinal mold box side walls. These division boards are provided at their sides with ribs or beads 16, and are connected in sets by tie-bars 17 which preferably correspond to the tie-bars 12 uniting the end boards, and which are connected at their ends to the longitudinal side walls of the mold box in a manner similar to that in which the tie bars 12 are connected to said walls.

18 are bottom plates which rest upon the truck platform 1 and which are positioned in the molding compartments between the longitudinal side walls of the mold box, the longitudinal partitions and the transverse end boards and transverse division boards. These bottom plates are preferably formed with irregular upper faces in order that the cement blocks molded thereagainst may be formed with roughened faces, though it is obvious that the bottom plates may have plane faces for the production of smooth faces upon the building blocks.

For the purpose of maintaining the transverse end boards 11 in upright positions and resisting pressure thereagainst in outward directions, I provide stop blocks 19 which occupy positions between said boards and the yokes 6.

20 designates track members which are mounted upon suitable supports such as a foundation A (see Figs, I, II and III). These track rails may be of any desirable number and each is provided with rails 21 and with a rack 22 located between said rails. The track members 20 extend at right angles to the track rails 3 on which the mold box carrying truck rides, and they are located at an elevation corresponding to the mold box when it is located opposite the support of said members.

23 designates carriages of which there may be any desirable number according to the number of track members 20 in use and which are operative on said truck members. Each carriage is preferably provided with inturned retaining lips 24 which engage beneath the track rails 21 and are adapted to hold said carriage from escape from the track member. Each carriage also has a housing 25. 26 is a pinion in each carriage housing which is arranged in mesh with the track member rack 22 on which the carriage rides. Each of these pinions is carried by a shaft 27 journaled in the carriage housing 25 and said shaft is adapted to be rotated by any suitable means, such as a crank or cranks 28 fixed thereto, whereby said pinion is rotated in mesh with the coincident rack 22 for the purpose of imparting movement to the carriage 23 on the track member 20 in either a forward or rearward direction. The carriages 23 are connected by a cross beam 29 which is suitable attached to the carriages so that it will travel therewith.

30 designates coring members which are carried by the cross beam 29 and which are preferably provided with conical points 31. These coring members are preferably arranged in pairs and they of sufficient length to permit of their being passed entirely through the mold box on the truck platform 1, which passage is rendered possible by the presence of the perforations 4' and 5' in the mold box side walls and longitudinal partitions.

In the practical use of my apparatus the mold box is first built up on the truck platform 1 by associating its various members and connecting them through the described means utilized for this purpose, and the truck being then positioned opposite to the coring members, the parts are ready for molding operation. The coring member 30 are then advanced from the position seen in Figs. I and III, to seat them in the mold box, this movement of the coring members being secured by the rotation of the pinions 26 in mesh with the racks 22 whereby the carriages 23 and the coring members are moved forwardly. The cement is then introduced into the various compartments of the mold box in which it surrounds the coring members so that said coring members will serve to produce perforations in the blocks as illustrated in Fig. VI. At the same time the ribs or beads 14 and 16 on the transverse end boards 11 and division boards 15, respectively, serve to produce grooves at the ends of the blocks which are also illustrated in Fig. VI. After the cement has become partially set the coring members are withdrawn from the mold box by reversing the travel of the carriages 23, thus leaving the molded blocks in their completed condition, and the blocks are removed by dismantling the mold box upon the removal of the various tie and binding members hereinbefore described. It is of course obvious that the mold box must be again set up before the next molding operation.

For the purpose of preventing tilting of the mold box supporting truck when the coring members 30 are withdrawn from the mold box, if there should be any tendency of the coring members to adhere to the cement, I preferably provide bumper rods 32 which are provided with heads 33. These bumper rods are firmly seated in the foundation A and their heads oppose the side of the mold box which faces the foundation on which the coring members are mounted, so that said mold box will strike against the heads of the bumper rods and be restrained from movement when the coring members are withdrawn from said box.

I am aware that it is not new to produce a mold box having perforations in the bottom thereof and to utilize coring members that enter the mold box through the perforation in its bottom and therefore I do not claim broadly the perforating of a mold box and the introduction thereinto of movable coring members.

My apparatus differs materially from the forms of apparatuses just mentioned in that the perforations in the mold box are produced in the mold box walls and partitions and extend horizontally therein as distinguished from their presence in the bottom of the box and the coring members are movable in a horizontal direction through the perforations into the mold box. There exists an important advantage in locating the perforations horizontally in the mold box walls and partitions and moving the coring members horizontally through said perforations. This advantage has its foundation in the fact that where the perforations are in the bottom of the mold box it is necessary to form the faces of the cement blocks at the sides of the mold compartments and in vertical lines and as a consequence the texture of the faces of the blocks must be made the same as the texture throughout the remainder of the blocks, whereas in the use of my apparatus it is rendered possible to produce the faces of the blocks at the bottoms of the mold compartments and therefore such faces may be made much harder and much more durable by using a different mixture of cement for what is to be the faces of the blocks, or making the cement mass from which the face portions of the blocks are to be produced much more moist than the remainder of the blocks.

It is an important feature in the construction of cement building blocks that their faces be hard and more durable than the remainder of the blocks, owing to the fact that the faces are exposed to the atmosphere and the elements, whereas the remainder of the blocks are unexposed and therefore very much less liable to deterioration when incorporated in a building wall.

I claim:—

1. In a mold box, the combination of a platform, perforated side walls mounted on said platform, perforated partitions mounted on said platform and arranged parallel to said side walls, inverted U-shaped yokes permanently secured to said platform and adapted to receive said side walls and partitions, tie rods extending through said yokes and the members therein, and means for subdividing the spaces between said side walls and partitions, substantially as set forth.

2. In a mold box, the combination of a platform, two series of inverted U-shaped yokes secured to said platform, perforated side walls and partitions seated in said yokes, means for securing said walls and partitions in said yokes, end boards removably seated between said partitions and between said walls and partitions, carrying bars detachably secured to said side walls and to which said end boards are attached, and stop blocks located between said end boards and said yokes, substantially as set forth.

JAMES B. TALBOT.

In presence of—
JULIAN F. BENTLEY,
OTTO FISCHER.